(12) United States Patent
Uhlenbusch

(10) Patent No.: US 8,974,273 B2
(45) Date of Patent: Mar. 10, 2015

(54) AIR NOZZLE

(75) Inventor: Olaf Uhlenbusch, Marktzeuln (DE)

(73) Assignee: Dr. Schneider Kunststoffwerke GmbH, Kronach (DE)

( * ) Notice: Subject to any disclaimer, the term of this patent is extended or adjusted under 35 U.S.C. 154(b) by 718 days.

(21) Appl. No.: 12/998,298

(22) PCT Filed: Oct. 12, 2009

(86) PCT No.: PCT/EP2009/063234
§ 371 (c)(1),
(2), (4) Date: Apr. 6, 2011

(87) PCT Pub. No.: WO2010/046253
PCT Pub. Date: Apr. 29, 2010

(65) Prior Publication Data
US 2011/0195650 A1  Aug. 11, 2011

(30) Foreign Application Priority Data

Oct. 21, 2008 (DE) ..................... 20 2008 008 891 U

(51) Int. Cl.
*B60H 1/34* (2006.01)
*F24F 13/065* (2006.01)

(52) U.S. Cl.
CPC ............ *F24F 13/065* (2013.01); *B60H 1/3442* (2013.01); *B60H 2001/3464* (2013.01)
USPC .......................... 454/154; 454/152; 454/155

(58) Field of Classification Search
CPC ...... B60H 1/34; B60H 1/3442; B60H 1/3414; B60H 1/3435; B64D 2013/003; F24F 13/065
USPC ......................... 454/152, 154, 155
See application file for complete search history.

(56) References Cited

U.S. PATENT DOCUMENTS

| 3,988,973 | A | * | 11/1976 | Honmann | 454/286 |
| 4,006,673 | A | * | 2/1977 | Meyer et al. | 454/154 |
| 4,092,907 | A | * | 6/1978 | Meyer et al. | 454/154 |
| 4,699,322 | A | * | 10/1987 | Jobst | 239/503 |

(Continued)

FOREIGN PATENT DOCUMENTS

| DE | 1 917 945 | 6/1965 |
| DE | 1 929 898 | 12/1965 |

(Continued)

OTHER PUBLICATIONS

International Search Report.

*Primary Examiner* — Steven B McAllister
*Assistant Examiner* — Jonathan Cotov
(74) *Attorney, Agent, or Firm* — Collard & Roe, P.C.

(57) ABSTRACT

The invention relates to an air nozzle for conducting an air flow from an air feed shaft or an air feed duct in a heating, a ventilating or an air-conditioning installation, particularly for passenger compartments in motor vehicles, consisting of a hollow-cylindrical housing with a front air outflow opening and a rear air inflow opening as well as an insert, which is mounted in the housing and by which the direction and/or the intensity of the air flow issuing from the air nozzle is or are variable. For improved mounting and easier assembly the insert has an outer surface which is spherical at least in sections and is supported at the inner surface of the housing by way of at least two bearing points of matching contour, wherein a spring element is associated with at least one bearing point.

11 Claims, 7 Drawing Sheets

(56) References Cited

U.S. PATENT DOCUMENTS

Figure 15:
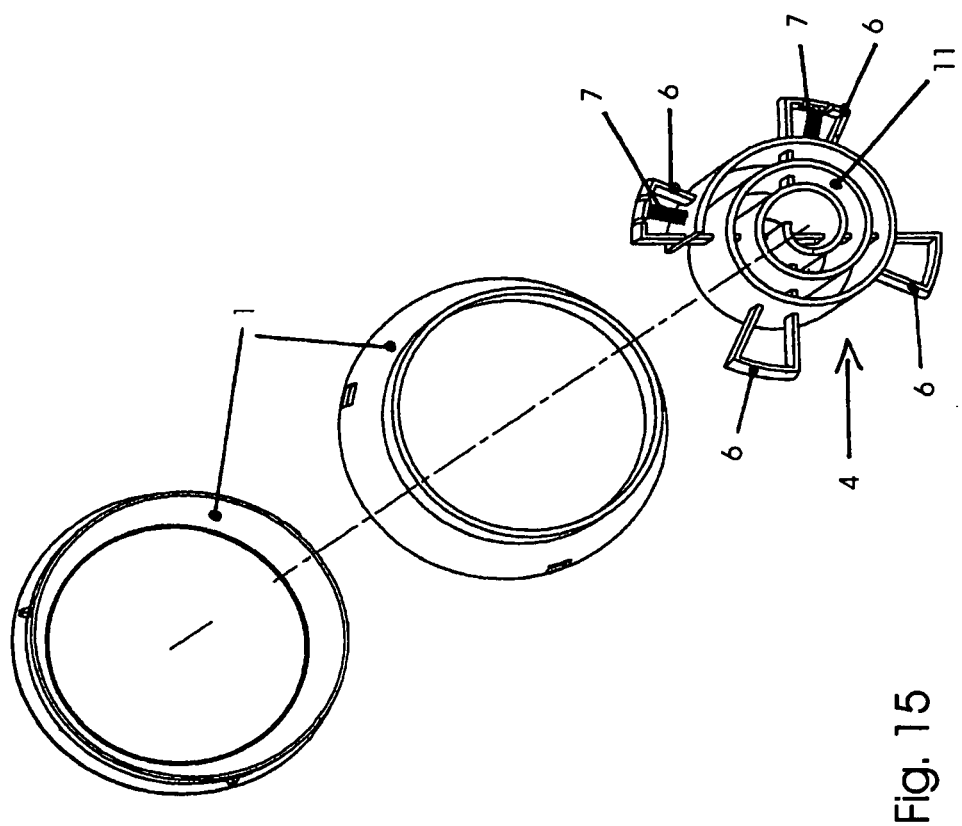

| | | | |
|---|---|---|---|
| 4,848,669 A * | 7/1989 | George | 239/539 |
| 5,127,876 A * | 7/1992 | Howe et al. | 454/76 |
| 5,399,119 A * | 3/1995 | Birk et al. | 454/76 |
| 5,575,715 A * | 11/1996 | Norbury et al. | 454/286 |
| 5,733,189 A * | 3/1998 | Eastwood | 454/155 |
| 5,890,958 A * | 4/1999 | Greiner et al. | 454/155 |
| 5,967,891 A * | 10/1999 | Riley et al. | 454/154 |
| 6,364,760 B1 * | 4/2002 | Rooney | 454/154 |
| 6,645,065 B2 * | 11/2003 | Rooney et al. | 454/154 |
| 7,288,023 B2 * | 10/2007 | Leopold | 454/152 |
| 7,527,553 B2 * | 5/2009 | Steinbeiss | 454/155 |
| 7,566,261 B2 * | 7/2009 | Ono et al. | 454/155 |
| 2005/0239390 A1 * | 10/2005 | Leopold | 454/154 |
| 2006/0172681 A1 * | 8/2006 | Steinbeiss | 454/152 |

FOREIGN PATENT DOCUMENTS

| | | |
|---|---|---|
| DE | 1 945 095 | 8/1966 |
| DE | 10 2005 012 538 | 10/2005 |
| DE | 10 2004 019 755 | 11/2005 |
| EP | 0 849 104 | 6/1998 |

\* cited by examiner

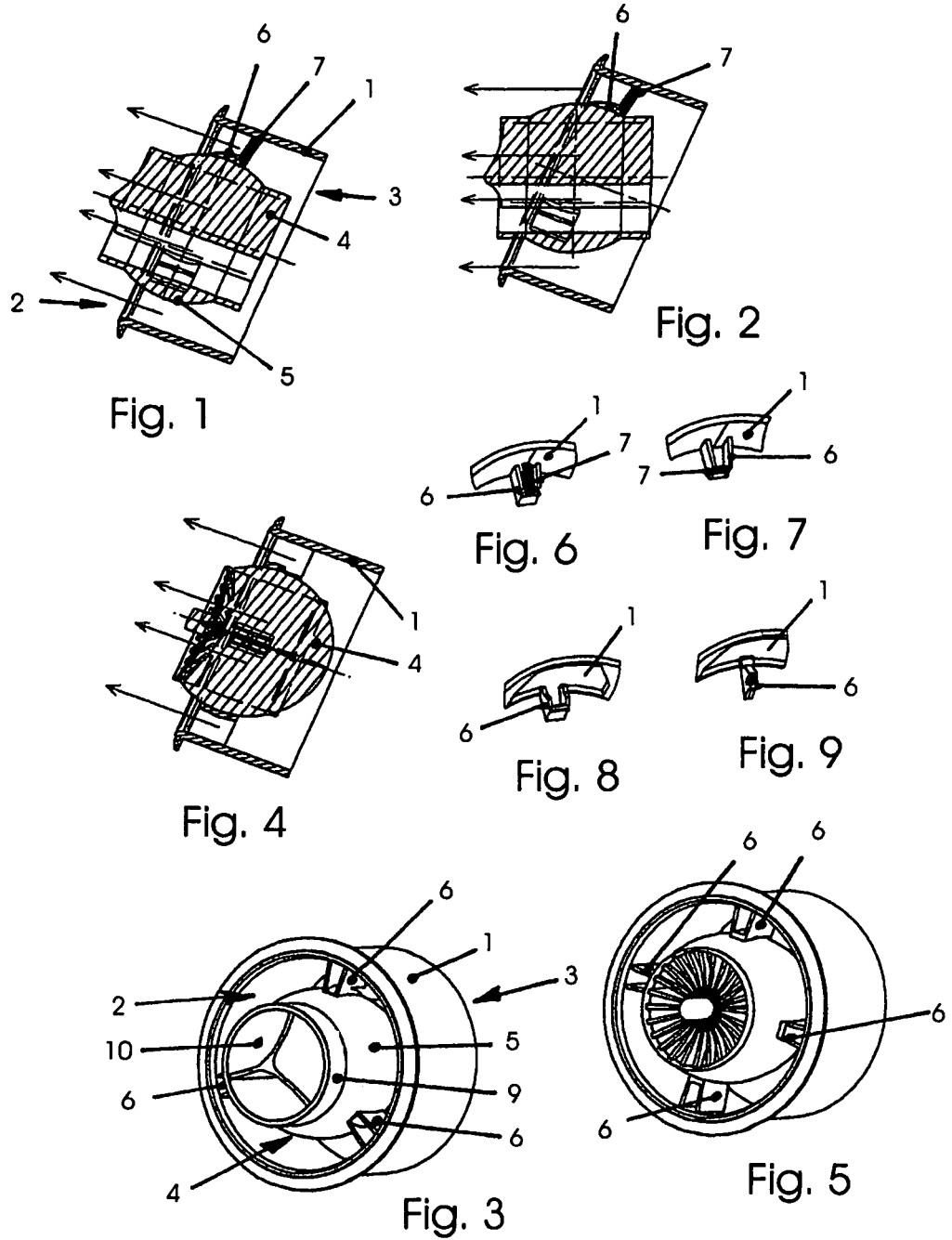

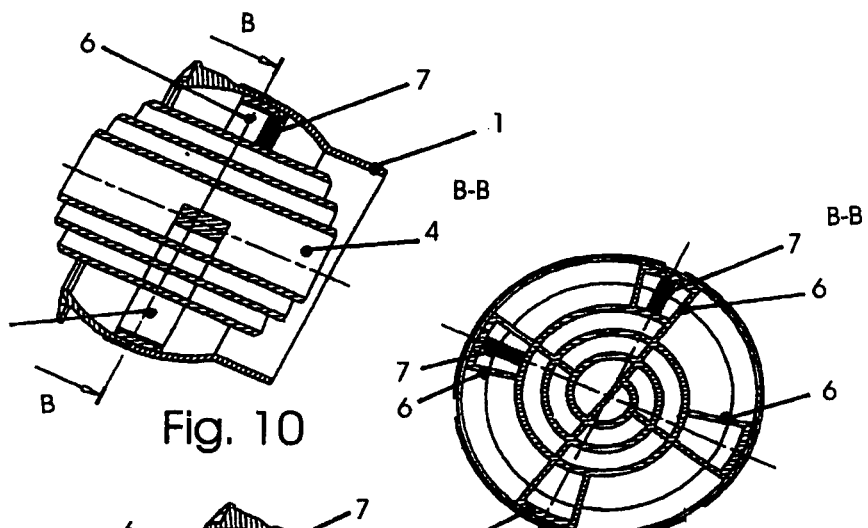
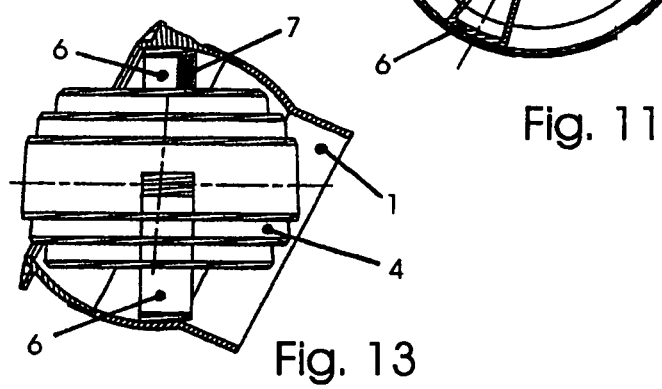
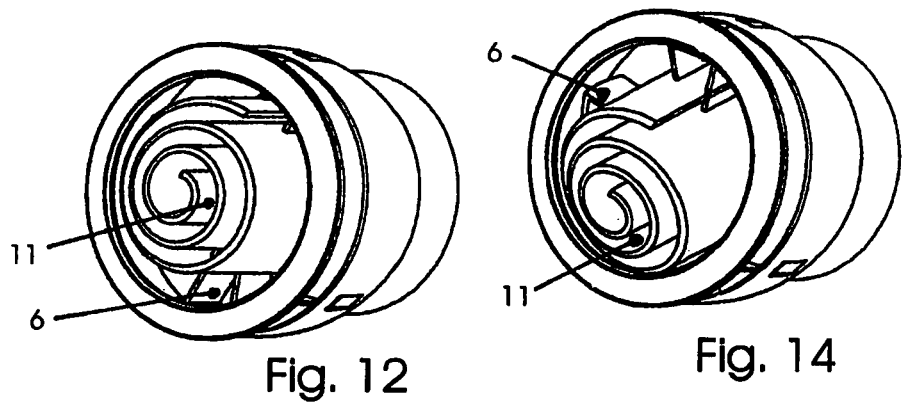

AIR NOZZLE

CROSS REFERENCE TO RELATED APPLICATIONS

This application is the National Stage of PCT/EP2009/063234 filed on Oct. 12, 2009, which claims priority under 35 U.S.C. §119 of German Application No. 20 2008 008 891.7 filed on Oct. 21, 2008, the disclosure of which is incorporated by reference. The international application under PCT article 21(2) was not published in English.

The invention relates to an air nozzle for conducting an air flow out of an air feed shaft or an air feed duct in a heating, ventilating or air-conditioning installation.

An air nozzle of that kind is known from DE 10 2005 012 538 B4. In this air nozzle the housing has a housing section with spherical wall sections for rotatable mounting of a drum-shaped insert with external spherical guide elements or shell-shaped wall sections. Provided in the insert are air guide means which are so constructed and arranged that through rotation of the insert in at least one rotational direction through an angle which is greater than the angle formed by the air outflow opening with respect to the central notional fulcrum of the insert at least two completely different kinds of outflows of the air flow and, in intermediate settings, combined outflows of the air flow are provided.

An air nozzle, which is for installation in a motor vehicle, with a spherically shaped nozzle head with outflow openings is known from DE 10 2004 019 755 A1 and is mounted in a housing to be rotatable and pivotable. In order to achieve improved mounting of the nozzle head, spring elements are provided as bearing points. The spring elements are spring arms which engage by shaped portions in recesses at the nozzle head so as to secure an individual adjustment. Due to the mounting, not only a surface friction between the spring elements and surface of the spherical nozzle insert, but also a friction at the outer surface, particularly at the collar at which the spring elements are fastened, are provided.

A spherical air nozzle is known from DE 1 917 945 U, which is mounted by a ball cup with a circularly round section to be rotatable and pivotable. The ball cup consists of a channel-side ball segment ring with brake spring tongues and a ball segment ring connected under the effect of shimming by a sealing ring. The ball head bears against the wall of the ball cup with simultaneous action of the brake spring tongues extending over ball sections.

An air outlet, which is constructed as a spherical ventilator, for roof air channels particularly in buses is known from DE 1 945 095 U, the air outlet providing a divergent air jet which has an approximately bell-shaped form and avoids a local draft phenomenon. The pivotable spherical insert is pivotably mounted in a passage opening by means of two bearing points, wherein one bearing point consists of a cover disc held by a bridge spring, the ends of which are held by retaining parts fixed in the housing. The spring is biased so that the spherical insert is not able to independently rotate due to travel-induced vibrations. The mounting of such an arrangement requires much skill and is complicated.

An air guide nozzle for ventilation of the interior of motor vehicles, with a bearing ring, which receives the ball nozzle and which consists of a carrier ring and a pressure ring spring-loaded thereagainst and engaging therein by way of support webs and fastened thereto, is known from DE 1 929 898 U. Wound around each of the connecting elements which connect the pressure ring with the bearing ring is a spiral compression spring which is supported by one end at the fastening flange of the pressure ring support web and by the other end at a ring, which protrudes oppositely thereto, of the connecting element. The pressure rings provided here do indeed retain the spherical insert, but are of extraordinarily complicated construction and have to be riveted in place at the appropriate points. Moreover, the friction area due to the compression ring is very large.

The object of the invention is to so construct an air nozzle described herein so that an improved support of the insert in the housing and a stable positional fixing of insert and housing relative to one another is achieved with minimization of bearing friction and a simple mounting is made possible, wherein an air gap is given between the housing wall and the insert.

This object is fulfilled by an air nozzle with the features described herein. Advantageous embodiments are the subject of dependent claims, the features of which are explained in more detail in the exemplifying embodiment.

In an air nozzle designed in accordance with the invention the insert has an outer surface which is spherical at least regionally and is supported at the inner surface of the housing by way of at least three bearing points of conforming contour, wherein a spring element is associated with at least one bearing point. In that case a resilient supporting of a nozzle insert by way of a spherical contour in a nozzle housing is achieved. By comparison with a Cardanic suspension, the suspension or support by way of spherical sections has the advantage that juddering is avoided, different levels of force do not arise and there are no dead points in the course of movement.

Consequently, an intuitive actuation and a high degree of actuation smoothness are achieved. Constant levels of torque can be achieved by the spring support and the supporting system is independent of temperature. Conventional plastics material springs would 'flow', i.e. with components of that kind their spring force would diminish with an increasing length of use.

The mounting has to be constructed at least as a three-point mounting, wherein at least one of the three bearing points should be assisted by means of a spring so as to avoid bouncing-out of the ball. In a further embodiment a four-point mounting can also be provided, wherein advantageously two bearing points should be assisted by means of a spring. Further embodiments with five and more bearing points are equally possible. However, cost then necessarily increases.

Accordingly, primarily variants with merely three or four bearing points are appropriate to many applications, particularly for the preferred use for passenger compartments of motor vehicles.

The bearing points can, in a simple form, be formed to be rib-shaped or, in a particularly advantageous variant, U-shaped, wherein the end faces of the surface of the insert are constructed to have matching curvature and form relatively small bearing surfaces.

A leaf spring or a compression spring can, for example, be used as the bearing point or spring engaging behind a bearing wall. The respective spring can press on a plastics material tongue of the bearing point. In that case, very good actuating smoothness is achieved, since plastics material slides relative to plastics material. Equally, the respective spring can also be freely suspended, for example a metal spring can press against the plastics material ball, wherein the bearing wall is pressed against the surface of the insert.

The insert functionally acting as an air guide element has, in a preferred variant, a spherical section and is hollow at the inside. A cylindrical collar can, for example, be mounted at the end-face end sections, which collar is effective as an abutment and thus limits the possible setting range of the relative movement of housing and insert.

The bearing point itself can, for example, also be injection-moulded as a hollow box-shaped structure, wherein the small bearing surface element, which is intended to protrude, bears against the surface of the spherical body of the insert by a bearing surface of matching contour. This surface element can also be constructed, at at least one of the bearing points, as a resilient element behind which engages a compression spring or leaf spring, which is supported at the housing wall of the air nozzle or at the base of the bearing point or the hollow box-shaped structure. The tongue-shaped wall forming the resilient element is thereby pressed against the spherical outer surface of the insert under application of the spring force. The mounting can also be realised by a bearing point which is arranged to be pivotably movable and which is supported by a spring. Diverse possibilities of embodiment present themselves here. It is just as possible to cut free in the housing surface a part surface or a tongue-shaped part surface behind which a spring engages in order to press it against the spherical outer surfaces at the insert under spring stress and under a small amount of friction, whereby a uniform contact with the bearing surfaces of all bearing points is ensured.

If the outer surfaces of the insert have ribs so as to allow air to pass through, it is evident that the invention can be used here as well, since the parts of the bearing point acted on by the resilience are pressed on. However, the contact area of the bearing point then has to be substantially increased so that a rib outer surface always has contact. The bearing arrangement and width of the curve and/or the inclination relative to the longitudinal axis of the nozzle housing in that case have to be so matched to one another that the curve cannot pass into the intermediate space of two ribs when the insert is pivoted.

Figure 17:
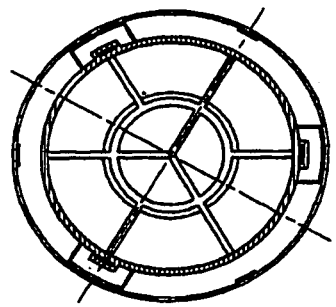
Figure 16:
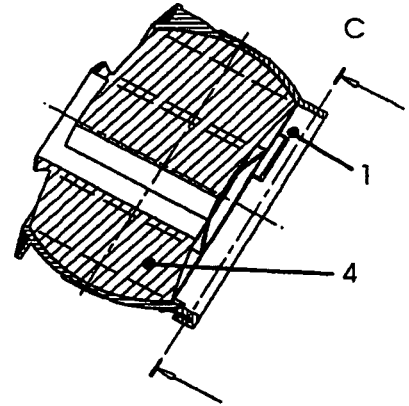
Figure 19:
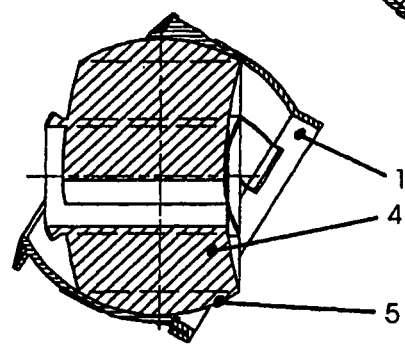
Figure 18:
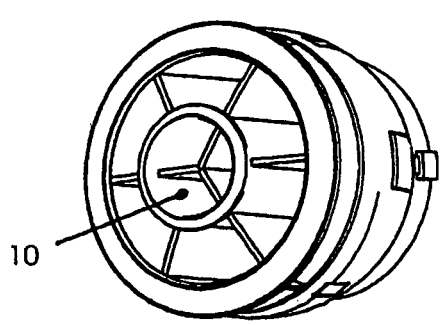
Figure 20:
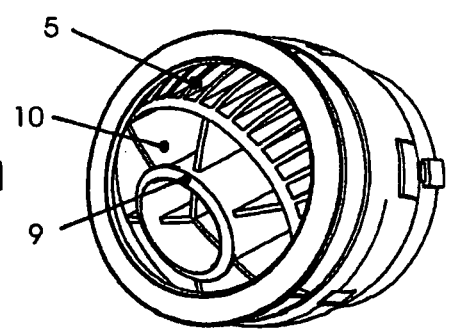
Figure 21:
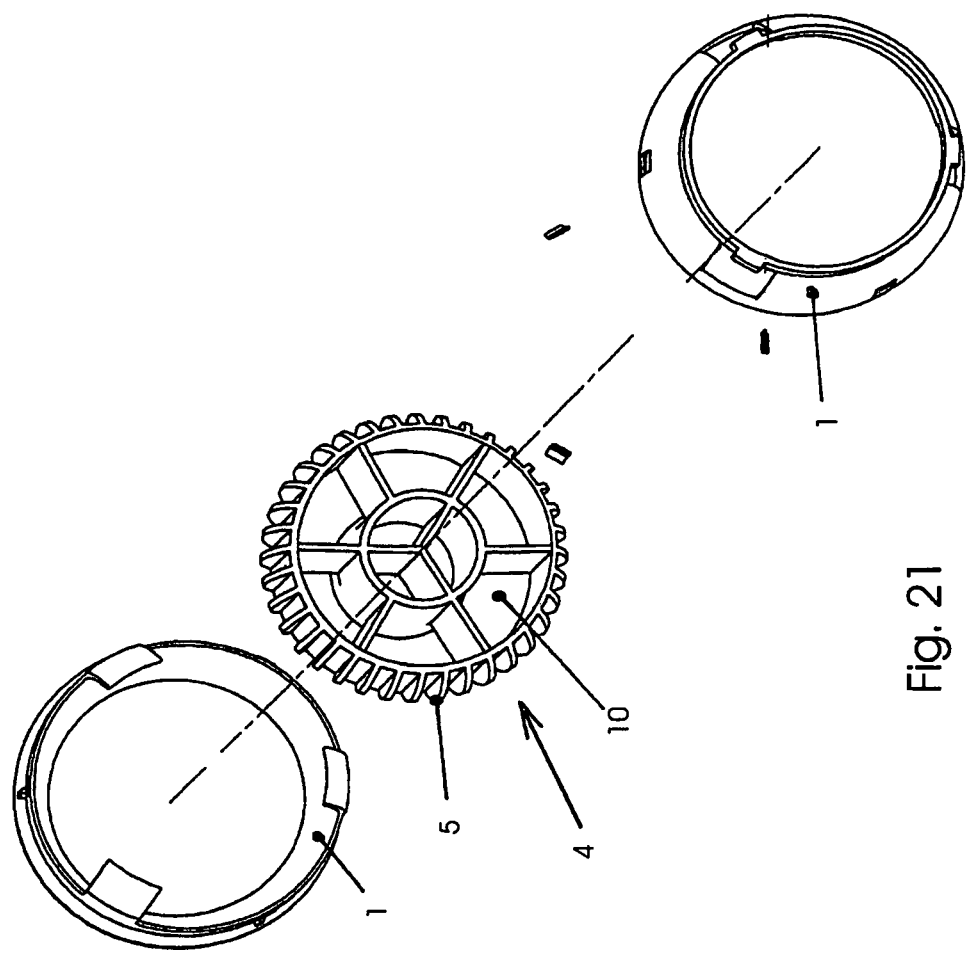
Figures 22, 26:
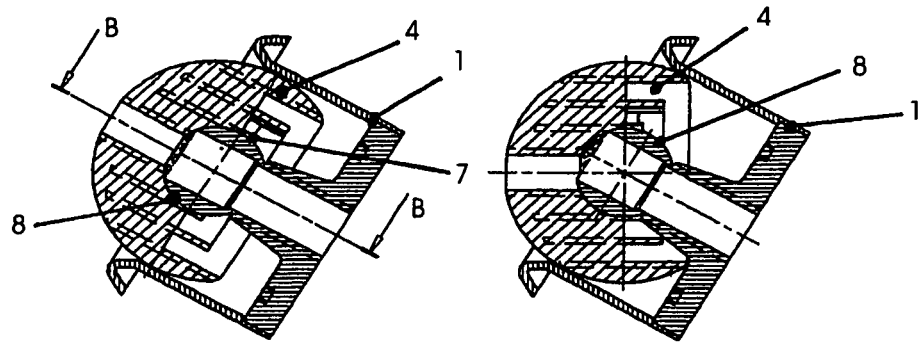
Figures 23, 24:
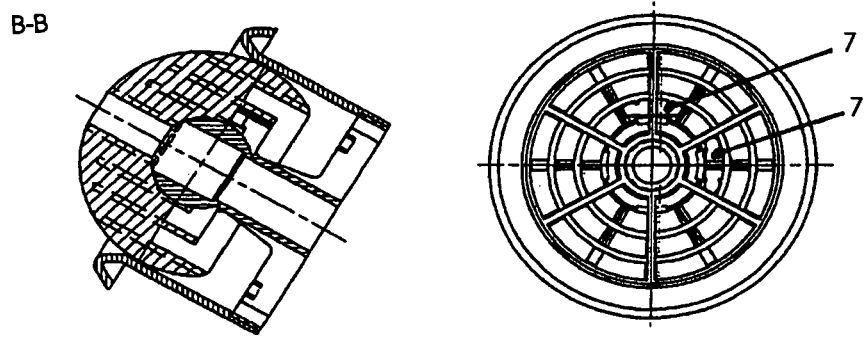
Figures 25, 27:
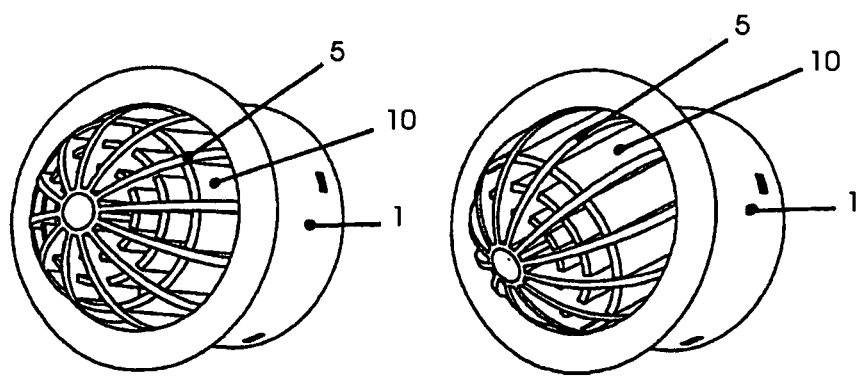
Figure 28:
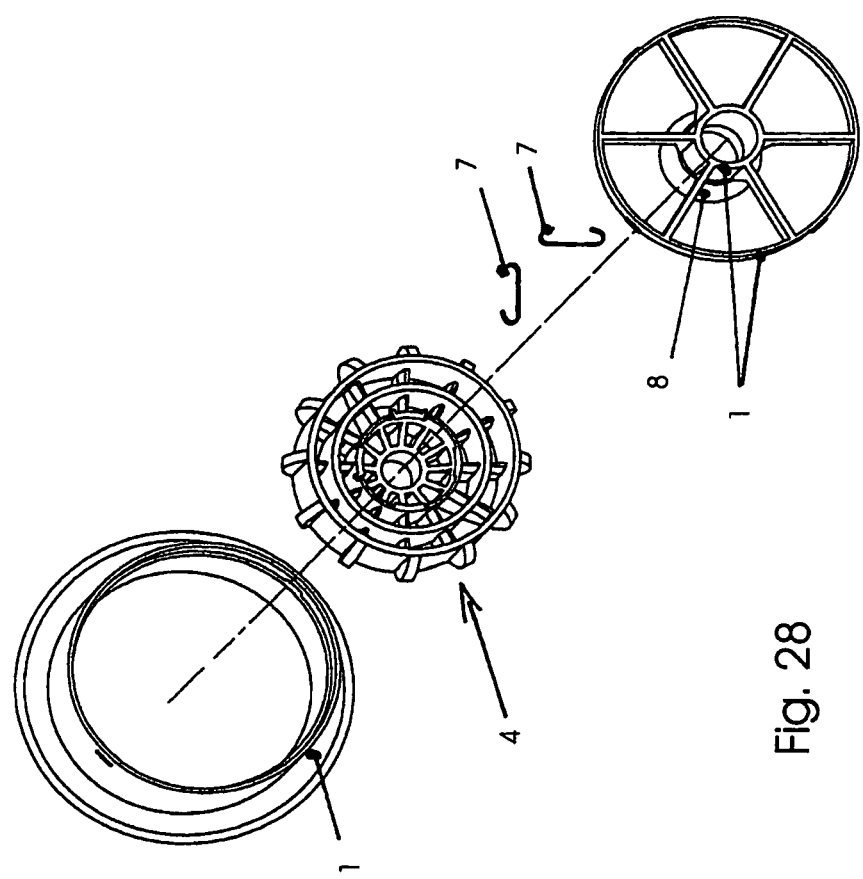

Exemplifying embodiments of the invention are described in the following and illustrated in the drawings, in which:

FIG. 1 shows an air nozzle in sectional illustration in a first embodiment of the invention, FIG. 2 shows the air nozzle according to FIG. 1 in another setting of the insert, FIG. 3 shows the air nozzle according to FIG. 1 in a perspective view, FIG. 4 shows an air nozzle in sectional illustration in a second embodiment of the invention, FIG. 5 shows the air nozzle according to FIG. 4 in a perspective view, FIG. 6 shows a first variant of the embodiment of a bearing point, FIG. 7 shows a modified variant of the embodiment of a bearing point, FIG. 8 shows a further modified variant of the embodiment of a bearing point, FIG. 9 shows a second variant of the embodiment of a bearing point, FIG. 10 shows an air nozzle in sectional illustration in a further embodiment of the invention, FIG. 11 shows a section along the line B-B of the air nozzle according to FIG. 10, FIG. 12 shows the air nozzle according to FIG. 10 in a perspective view, FIG. 13 shows the air nozzle according to FIG. 10 in another setting of the insert, FIG. 14 shows the air nozzle according to FIG. 13 in a perspective view, FIG. 15 shows an exploded illustration of the air nozzle according to FIG. 10 to FIG. 14, FIG. 16 shows an air nozzle in sectional illustration in a further embodiment of the invention, FIG. 17 shows a section along the line C-C of the air nozzle according to FIG. 16, FIG. 18 show the air nozzle according to FIG. 16 in a perspective view, FIG. 19 shows the air nozzle according to FIG. 16 according to another setting of the insert, FIG. 20 shows the air nozzle according to FIG. 19 in a perspective view, FIG. 21 shows an exploded illustration of the air nozzle according to FIG. 16 to FIG. 20, FIG. 22 shows an air nozzle in sectional illustration in a further embodiment of the invention, FIG. 23 shows a section along the line B-B of the air nozzle according to FIG. 22, FIG. 24 shows the air nozzle according to FIG. 22 in a front view, FIG. 25 shows the air nozzle according to FIG. 22 in a perspective view, FIG. 26 shows the air nozzle according to FIG. 22 in another setting of the insert, FIG. 27 shows the air nozzle according to FIG. 26 in a perspective view and FIG. 28 shows an exploded illustration of the air nozzle according to FIG. 22 to FIG. 27.

The air nozzles illustrated in the drawings are suitable for conducting an air flow from an air feed shaft or an air feed duct in a heating, a ventilating or an air-conditioning installation. An application with respect thereto is, for example, use in a passenger compartment in a motor vehicle. Such air nozzles can also be used in aircraft, in cabins in watercraft or in stationary rooms or other spaces.

The air nozzle according to FIGS. 1 to 5 consists of a hollow-cylindrical housing 1 with a front air outflow opening 2 and a rear air inlet opening 3.

Mounted in the housing 1 is an insert 4 by which the direction and/or the intensity of the air flow issuing from the air nozzle can be changed. The insert 4 has, at least regionally, a spherical outer surface 5 and is supported at the inner surface of the housing 1 by way of at least two bearing points 6 of conforming contour. A spring element 7 is associated with one of these bearing points 6.

FIG. 1 to FIG. 3 show an embodiment in which the insert 4 is supported at the inner surface of the housing 1 by way of three bearing points 6. According to FIG. 1 and FIG. 2 a spring element 7 is associated with one bearing point 6. The bearing wall, which has a bearing surface matched to the outer contour of the spherical outer surface 5, is constructed as a bearing wall which is fastened at one side to the bearing point and behind which engages a spring element 7, namely a compression spring, which is in turn supported at the nozzle housing. The compression spring 7 presses the bearing wall against the outer surface 5 of the insert 4 so that under distribution of pressure over the bearing points 6 the outer surface also bears by its bearing surfaces against the further bearing points 6 and can be pivoted in different directions by virtue of the spherical shape. The bearing point 6 itself has a ribbed structure. The bearing wall is fixed at the ends to the ribs fastened to the inner surface of the housing wall. At least the one bearing wall is in that case so constructed that a spring 7 engages behind it and the wall bears under spring pressure against the outer surface 5 of the spherical body of the insert 4. It is obvious that by virtue of this spring 7 a simple insertion of the insert during assembly is made possible, but that on the other hand a defined spring force also acts as friction force on the outer surface 5 and thus a desired pressing force against the outer surface 5 of the spherical insert 4 is settable.

FIG. 4 and FIG. 5 show an embodiment in which the insert 4 is supported at the inner surface of the housing 1 by way of four bearing points 6. In this regard, a respective spring element 7 is preferably associated with each of two of these bearing points 6. Further constructions with in each instance four bearing points 6 are apparent from FIG. 10 to FIG. 15.

The bearing points 6 can be formed at the inner surface of the housing 1 and oriented radially with respect to the insert 4. The bearing points 6 themselves can be glued or welded to the inner side of the housing wall or even, if they similarly consist of plastics material, moulded in place. Details with respect thereto are illustrated in FIG. 5 to FIG. 9. In that case, FIG. 5 to FIG. 8 show bearing points 6 with a U-shaped contour in different variants. FIG. 6 shows a bearing point 6 with a spring 7 which engages behind a front bearing wall, as is used in FIGS. 1 to 3. FIG. 7 shows a form of embodiment in which the bearing wall, which bears against the outer side 5 of the insert 4 by its bearing surface of conforming contour, is itself constructed as a resilient part and has a tongue shape. The rear sides of the two ribs of the bearing points 6 form the counter-bearing of the resilient bearing wall. However, the bearing points 6 can, as is also apparent from FIGS. 8 and 9, be integrally formed at cut-free portions in the housing wall. The cut-free housing wall portions in that case ensure resilience. The bearing point 6 can, as apparent from FIG. 9, also consist of two webs lying closely adjacent to one another or, however, also consist of a single web or a single rib.

Alternatively to the arrangement at the inner surface of the housing 1, the bearing points 6 can similarly be arranged at the outer surface of the insert 4. The bearing points 6 are then oriented radially with respect to the housing 1, wherein alternative embodiments with a U-shaped or rib-shaped contour are also possible here. FIG. 10 to FIG. 15 show a corresponding embodiment with U-shaped bearing points 6.

Moreover, embodiments are apparent from FIG. 16 to FIG. 21 in which a plurality of spherical outer surfaces 5, which here are formed similarly to ribs, is provided at the circumference of the insert 4.

Regardless of the actual arrangement and construction, the spring element 7 is associated with at least one of the bearing points 6. The spring element 7 can act on a plastics material tongue or also be freely suspended. In addition, the spring element 7 can be designed as a leaf spring or a compression spring.

FIG. 22 to FIG. 28 show an air nozzle in which a bearing point is arranged in the interior space of the housing 1. This bearing point is oriented axially with respect to the centre longitudinal axis of the housing 1. In that case, an effective support is achieved in that respective part-spherical and mutually congruent sections 8 functionally acting as a bearing point are formed at the housing 1 and the insert 4. At least one spring element 7 is then arranged in the transition region of the two part-spherical sections 8 of housing 1 and insert 4.

The insert 4 always has at its outer surface a section with a spherical surface 5. According to FIG. 1 to FIG. 3, for example, merely one circularly annular section with a spherical surface 5 is provided. Thereagainst, the insert 4 according to FIG. 22 to FIG. 28 is, for example, formed at its outer surface to a size of approximately three-quarters of a sphere with a spherical surface 5 which here extends similarly to ribs. Numerous further stages with a spherical surface 5 of respectively different size are possible between these variants with circular ring and three-quarters of a sphere.

The housing 1 and the insert 4 can in addition be formed in various ways. Thus, the housing 1 can be produced as a constructionally unitary injection-moulded component. Alternatively, it is possible to join the housing 1 together from several separate individual parts, for example by means of a snap connection. Variants with respect thereto are apparent particularly from the exploded illustrations according to FIG. 15, FIG. 21 and FIG. 28.

A respective cylindrical collar 9 can be provided at the insert 4 at the end sections oriented towards the air outflow opening 2 and/or air inflow opening 3. Details with respect thereto are apparent from, for example, FIG. 3 and FIG. 20.

Moreover, the insert 4 can have a plurality of separate flow channels 10 respectively extending in longitudinal direction of the insert 4, as is apparent from, for example, FIG. 3, FIG. 5, FIG. 18 and FIG. 25. Instead of such flow channels 10 the insert 4 can, according to FIG. 14 and FIG. 15, be formed with a flow channel 11 spirally encircling its longitudinal axis.

REFERENCE NUMERAL LIST 1 housing
2 air outflow opening
3 air inflow opening
4 insert
5 spherical outer surface at the insert
6 bearing point
7 spring element
8 part-spherical bearing section
9 cylindrical collar at the insert
10 longitudinally oriented flow channel at the insert
11 spiral flow channel at the insert

The invention claimed is:

1. Air nozzle for conducting an air flow from an air feed shaft or an air feed duct in a heating installation, a ventilating installation, or an air-conditioning installation, the air nozzle comprising
a hollow-cylindrical housing with a front air outflow opening and a rear air inflow opening,
an insert mounted in the housing and having an outer surface spherical at least in spherical sections of the outer surface, and
at least three bearing points supporting the insert, the at least three bearing points having respective bearing surfaces having a contour matching the spherical sections of the outer surface of the insert, the direction and/or intensity of the air flow issuing from the air nozzle being variable by the insert,
wherein the at least three bearing points are directly arranged at the inner surface of the housing to protrude and are formed to be oriented radially with respect to the insert and have a rib-shaped profile,
wherein at least one bearing point of the at least three bearing points comprises a pivotably or slidably mounted bearing wall with a bearing surface behind which a spring element engages, the spring element being supported at the inner surface of the housing,
wherein the at least one bearing point further comprises a first rib and a second rib,
wherein the pivotably or slidably mounted bearing wall is connected to the first rib and to the second rib,
wherein the spring element is disposed between the first rib and the second rib, and
wherein the pivotably or slidably mounted bearing wall is mounted so as to slide or pivot past the first rib and past the second rib due to a spring pressure of the spring element so that the pivotably or slidably mounted bearing wall bears against the outer surface of the insert.

2. Air nozzle according to claim 1, wherein the bearing surface element is tongue-shaped and made of plastic material.

3. Air nozzle according to claim 1, wherein the spring element is suspended in relation to the pivotably or slidably mounted bearing wall.

4. Air nozzle according to claim 1, wherein the spring element is formed as a compression spring.

5. Air nozzle according to claim 1, wherein the at least three bearing points are arranged in the interior space of the housing and are formed to be oriented axially with respect to the center longitudinal axis of the housing.

6. Air nozzle according to claim 5, wherein respective part-spherical, mutually congruent sections are formed at the housing and the insert or
   wherein the insert has at its outer surface a circularly annular section with a spherical surface.

7. Air nozzle according to claim 6, wherein the spring element is arranged in the transition region of the part-spherical sections of the housing and insert.

8. Air nozzle according to claim 1, wherein the insert has at its outer surface a spherical surface having a size approximately corresponding with three-quarters of a sphere.

9. Air nozzle according to claim 1, wherein the insert has a cylindrical collar at its end section directed towards the air outflow opening and/or towards the air inflow opening.

10. Air nozzle according to claim 1, wherein the insert has a plurality of separate flow channels each extending in the longitudinal direction of the insert.

11. Air nozzle according to claim 1, wherein the insert has a flow channel running spirally around its longitudinal axis.

* * * * *